UNITED STATES PATENT OFFICE.

WALTER S. LANDIS, OF NIAGARA FALLS, ONTARIO, CANADA, ASSIGNOR TO AMERICAN CYANAMID COMPANY, OF NASHVILLE, TENNESSEE, A CORPORATION OF MAINE.

PROCESS OF PRODUCING AVAILABLE PHOSPHORIC ACID.

1,094,857.   Specification of Letters Patent.   Patented Apr. 28, 1914.

No Drawing.   Application filed July 12, 1913. Serial No. 778,730.

*To all whom it may concern:*

Be it known that I, WALTER S. LANDIS, a citizen of the United States, residing at Niagara Falls, in the Province of Ontario and Dominion of Canada, have invented certain new and useful Improvements in Processes of Producing Available Phosphoric Acid; and I do hereby declare the following to be a full, clear, and exact description of the invention, such as will enable others skilled in the art to which it appertains to make and use the same.

This invention relates to a process of rendering available, as a plant food, insoluble phosphates, and has for its object to provide a method which will be more expeditious as well as more efficient than those heretofore proposed.

With these and other objects in view, the invention consists in the novel steps constituting my process all as will be more fully hereinafter disclosed and particularly pointed out in the claims.

It is known when sodium sulfate $Na_2SO_4$ or sodium carbonate $Na_2CO_3$ is mixed with finely ground phosphate rock, such as Tennessee or Florida rock, which contains phosphoric acid, in the form of a tricalcium phosphate, and the mixture then heated, that the phosphoric acid present is changed from the tricalcium form to a form which responds to the standard availability tests as proposed by the Official Association of Agricultural Chemists. It is also well known that heretofore in order to bring about this transformation on a commercial scale, the mixture has usually been ground to a greater or less fineness, treated with water and heated in a rotary kiln or other device, until the conversion took place. But in all such cases it is equally well known that the efficiency of the conversion has been low and unsatisfactory, a large amount of the phosphate being discharged from the heating apparatus with, say, only half of the phosphate transformed, or when a high efficiency of conversion was obtained, the total output from the kiln was so low and the fuel consumption so high that the process as a whole was a commercial failure. I have discovered that the cause of this failure is largely due to the slow drying of the mixed materials in the kiln, which permits the sodium salt or salts to crystallize and therefore segregate so that the calcining process does not yield good results, all as will presently appear.

In carrying out my process I take, for example, ground Tennessee phosphate rock or Florida pebble phosphate rock, or any other phosphate material, in which the phosphorus is present essentially in the form of a tricalcium phosphate, and mix the same with say 5% to 20% of sodium carbonate, or sodium sulfate, commonly known as salt cake or niter cake. I prefer to mix these materials dry in the proper proportions, and find about 10% sodium carbonate gives good results, or slightly more than 10% of sodium sulfate. I preferably grind them wet in a tube mill or any other similar fine grinding device, and have found that the finer the grinding the lower may be the temperature of the subsequent calcining operation, the shorter the duration of the said operation, and the less the quantity of the reagent required. A fineness permitting 85% to 90% of the mixture to pass through a 200 mesh screen, gives very satisfactory results. I find also that the amount of water added plays a very important part in the subsequent chemical reaction that takes place in the kiln. In fact, this water of addition and its subsequent removal, constitutes an important portion of the novelty of my process, as will appear below, for I have found it is conducive to the best results in this process to add just enough water to make a saturated solution of the sodium salt. In other words, where there has been heretofore added 15% of sodium sulfate, it was found necessary to add from 30% to 40% of water to the weight of the dry mixture of ground phosphate rock, and sodium sulfate. The exact amount depends somewhat upon the temperature of the mixed materials for, of course, the temperature influences the solubility of the sodium sulfate. But such a saturated solution, upon suffering a change of temperature, or being subjected to evaporation of its water, will immediately show evidences of crystallization of the sodium sulfate; and if these changes in temperatures are slow, or if the evaporation process is slow, the crystals grow very rapidly indeed. This, of course, causes a segregation of the sodium sulfate reagent, as above stated, as well as an uneven distribution; so that if such a mixture is put into a rotary kiln, the results are extremely disappointing. Further, if a wet mixture of phosphate rock and sodium sulfate is charged into a long rotary kiln at a commercial rate of feed, the consequent slow evaporation necessitated by such a kiln, seems to cause this crystallization to take place in the kiln itself, and the calcining of such a segregated mass therefore does not yield good results. On the other hand, I have discovered if a mixture of phosphate rock, sodium sulfate and water is prepared in the proportions of,—for example—100 parts phosphate rock, 12 parts sodium sulfate and 40 parts water, and dried quickly by being dropped and spread out in a thin layer on a very hot surface, no such crystallization and segregation as described above, will take place, and there will result from such drying a dry porous mass of considerable strength, which may be fed to a rotary kiln at a very fast rate, while the resulting product out of the kiln will show 97% of the total phosphoric acid present as being in the "available" form.

To make the difference between my process and the old process very clear, it is said:—A 5'x40' kiln fed with wet material directly will not produce over 600 lbs. to 800 lbs. of a product per hour showing say 95% of the phosphoric acid available. If, however, the material is dried in the instantaneous manner above described, and the dry mass fed to the kiln, then the output of the same kiln will be from 5000 lbs. to 8000 lbs. of the same product per hour, with a consequent lowering of the fuel consumption of the kiln. Further, the subsequent calcination in the kiln offers no difficulties with a properly dried material, whereas it is practically impossible to get a uniform product without such drying. The temperatures at which this calcination takes place in a kiln are between say 900° C. and 1300° C., although this will vary with the fineness of grinding, the evenness of distribution of the reagent and the character of the phosphate rock employed, as certain impurities, like silica and lime in the rock, have a decided influence upon the necessary temperature for such calcination.

It will now be clear that an essential feature of my process, consists of a rapid preliminary drying of the mixture before heating the mass in the kiln, such drying serving to rapidly drive off the water, so that no segregation of soluble salts can take place, and no large crystals can be formed, whereby I maintain a perfectly uniform distribution of the reagent in the mixture, from the beginning of the process to the end.

Of course I do not wish to be restricted in any way to any particular type of drying apparatus, but a very highly heated rotating cylindrical drier is found satisfactory. For instance, a drier lined with a refractory material, and so highly heated that the surface upon which the wet material falls is red hot at the time of impingement of the wet mass operates well, and especially if the mass is fed in a thin layer on such highly heated surface, so that the drying will be almost instantaneous. It is also desirable to finely divide the mixture after calcining, but this is only necessary to develop its highest availability.

What I claim is:—

1. The process of treating phosphatic material in order to render insoluble phosphates available which consists in preparing a finely divided mixture consisting of said material, a sodium salt and water; drying said mixture without permitting said salt to crystallize to a substantial extent; and then calcining the dried mixture to render soluble the contained phosphates, substantially as described.

2. The process of changing insoluble phosphates into the soluble form which consists in preparing a finely divided mixture of tricalcium phosphate material, a sodium salt and water; drying said mixture so rapidly that no substantial crystallization of a contained soluble salt will take place; heating said dried mixture to a temperature sufficient to effect the desired transformation; and subsequently finely dividing the calcined mixture, substantially as described.

3. The process of changing the insoluble phosphates in phosphate rock into the soluble form which consists in finely dividing said rock; mixing sodium sulfate therewith; treating the mixture with water; drying the wet mixture thus produced so quickly as to prevent said sodium sulfate from crystallizing to an appreciable extent; and finally calcining said dried mixture at a temperature sufficient to produce the desired change, substantially as described.

4. The herein new composition of matter suitable for calcining consisting of a thoroughly dried mixture of divided phosphate rock and a soluble sodium salt substantially free from soluble crystals, substantially as described.

In testimony whereof I affix my signature, in presence of two witnesses.

WALTER S. LANDIS.

Witnesses:
S. HANNA,
J. L. DOLAN.